3,069,410
PROCESS FOR MODIFYING STARCH AND THE
RESULTING PRODUCTS
Clifford E. Smith and John V. Tuschhoff, Decatur, Ill., assignors to A. E. Staley Manufacturing Company, Decatur, Ill., a corporation of Delaware
No Drawing. Filed Sept. 17, 1959, Ser. No. 840,518
10 Claims. (Cl. 260—233.3)

This invention relates to the reaction of starch with a new chemical modifying agent and to the useful modified starch products thus obtained. More specifically, it relates to the reaction of starch with acrolein and to the resulting starch products. This application is a continuation-in-part of our copending application, Serial No. 692,024, filed October 24, 1957, now abandoned.

It is well known that the pasting and paste properties of starch may be modified by reacting the starch granules with suitable reagents. Esterification and etherification are frequently used for this purpose. The required degree of substitution is usually low, however, and the granular reaction products superficially resemble the original starch.

In general, reaction with a mono-functional esterifying or etherifying reagent lowers the pasting temperature of the starch. When the degree of substitution reaches an average of about one group per two anhydroglucose units, many such starch derivatives—well exemplified by the hydroxyethyl ether—paste in water at 25-35° C., whereas most native starches paste at 70-75° C. Also, the water pastes of this type of chemically modified starch differ materially from those of the parent starch. As a general rule, paste clarity and viscosity are substantially changed and the congealing of hot pastes on cooling and aging is reduced. The modification of corn starch, in particular, with the monofunctional chemical reagents yields products displaying these differences to a marked degree.

Reaction of starch with selected bifunctional reagents, e.g., epichlorohydrin, succinic acid, and ethylene dibromide yield products which at low degrees of substitution, are similar in one respect to the monofunctional reagent derivatives: the water pastes of these products are more viscous than those of the parent starch. However, as the extent of reaction between granular starch and bifunctional reagent increases, the paste viscosity of the reaction product reaches a maximum value, and then declines. The pastes or, more accurately, the mixtures of hot water and swollen modified starch granules become noticeably shorter in texture, less cohesive, and more opaque. Eventually, as the degree of substitution increases, a point is reached at which the granules swell little or none in boiling water and settle out, if unstirred, much the same as they (and untreated starch granules) do from cold water. In extreme cases, the starch granules resist swelling or pasting in hot sodium hydroxide solutions.

We have discovered that acrolein and crotonaldehyde react readily with starches and starch materials generally to modify the paste and pasting properties of the raw materials. Granular unpasted starches yield products with paste and pasting properties similar to those of the inhibited starches described in United States Patent 2,500,950. Since it is well known, however, that inhibited starches may be obtained by processes which probably, or at least apparently, do not involve chemical cross-linking (cf. United States Patents 2,121,502; 2,124,372; 2,317,752), we do not imply that acrolein cross-links starch, and we make no claims about the mechanism of the reaction between starch and acrolein. However, the reaction in accordadnce with this invention alters the pasting properties of the starch in this manner only when the aldehyde group as well as the double bond have reacted. As illustrated hereafter, when the reaction product is free from aldehyde groups, as determined by the silver mirror test, the paste properties of the starch are substantially altered.

German Patents Nos. 129,884 and 131,399 disclose the treatment of starch with acrolein to produce antiseptic materials. The antiseptic qualities of these materials appear to be due to the presence of free aldehyde groups in the product. That the products do contain free aldehyde is indicated by the fact stated in the German patents, that the products reduce alkaline silver solutions, apparently forming a silver mirror, as is well known. However, we have found that unless the aldehyde group reacts with the starch, the pasting properties of the starch are virtually unchanged.

A broad object of our invention is to provide a new method for modifying the paste properties of starch.

Another object is to provide a new method for modifying the paste properties of starch which is applicable to granular, i.e., unpasted starch without pasting or gelatinizing the granules.

A further object is to provide a new method, applicable to pasted starch, which will usefully alter the properties of the paste.

Another object is to provide a new method for increasing the viscosity of starch pastes.

An additional object is to provide a new method for reducing the congealing of hot starch pastes on cooling and aging.

A further object is to provide a new method for reducing the drop in viscosity when a starch paste is subjected to mechanical shear or held for considerable time at elevated temperatures.

Another object is to provide a new method for usefully altering the paste properties of starch which can be carried out rapidly at room temperature with low proportions of chemical modifying agent.

Still another object is to provide a new and efficient method for chemically modifying starch granules which can be controlled to yield the reaction product as superficially unchanged granules, whose paste properties will vary gradually from those of the original starch to a product which will not paste in boiling water or in hot caustic soda solution.

Another broad object of our invention is the provision of new and useful chemically modified starch products.

Other objects of our invention will appear hereinafter.

These objects are achieved in accordance with our invention by reacting starch with acrolein, preferably under alkaline conditions as set forth and exemplified in the following description.

Our invention applies to starches and starch materials in general. The term "starch" as used in the description of our invention and in the appended claims includes the following categories of materials: native starches, whether waxy or non-waxy, and independently of their vegetable origin; modified starches such as the oxidized starches, the acid-modified thin boiling starches, and mechanically modified starches such as those obtained by ball-milling and by milling between smooth, differential rolls; dextrins, whether obtained by heat alone, or a combination of heat and catalyst; and starch derivatives such as the esters and ethers, typical examples being starch acetate, starch hydroxyethyl ether, and starch methyl ether. Its effect is additive on starches already modified by physical or chemical action, including derivatization.

We have found that acrolein reacts rapidly with starch in any of the following physical forms: aqueous paste, aqueous suspension of ungelatinized granules, and a superficially dry mass of granules containing 10 to 25% moisture.

The reaction of acrolein with starch is more rapid and efficient under alkaline conditions than neutral or acid. The preferred degree of alkalinity on the pH scale is 10–12. Our invention is not limited, however, to an alkaline reaction. We have found, as illustrated hereafter, that starch reacts with acrolein in the absence of either acids or bases when the two are heated together in a closed vessel. In the absence of the alkali catalyst, the elevated temperature is necessary to obtain a practical reaction rate.

Reaction rate at the preferred pH range of 10–12 is satsifactorily rapid at 20–30° C., i.e., about room temperature, and unless special circumstances require a different reaction temperature, we prefer the range of 20–30° C. Also, the reaction can be performed at pH values above 12, but with the disadvantages of greater alkali usage, the production of more salt if the alkali is later neutralized, and the difficulty of preventing gelatinization of granular starch.

The pH of a reaction paste or slurry can be measured directly with suitable indicators or pH meter. The same technique can be applied to a dry reaction mixture after a sample of the mixture has been slurried with five to ten parts of water.

Under alkaline conditions, allylidene diacetate hydrolyzes to acrolein and is thus equivalent to acrolein in our invention. We have also employed crotonaldehyde which also alters the paste properties of the starch, but has much less effective, mole for mole, than acrolein. Crotonaldehyde reacts with starch under the same conditions as acrolein.

For a more complete understanding of the invention, particularly with respect to illustrative embodiments thereof, reference may now be had to the following examples, in which all parts are by weight unless otherwise indicated

Example 1

An aqueous alkaline slurry of native unpasted corn starch is prepared by mixing 100 parts of the granular starch (12% moisture) with 125 parts of water at 25° C. and 0.7 part of sodium hydroxide. To the well-stirred slurry, at 25° C. and 11.5 pH, is added 0.25 part of acrolein. The mixture is stirred two hours at 25° C., then it is neutralized to 6.5 pH with sulfuric acid and filtered. The wet cake of unpasted starch granules is washed with water on the filter and dried. Superficially, the dried reaction product resembles the parent starch. It does not form a gelatinous paste with neutral hot water. The granules swell slightly in boiling neutral water, but settle out as a separate phase on standing. The reaction product does form a paste, however, in hot dilute alkali, and furthermore, the viscosity of this paste changes but little during prolonged heating and stirring. For this reason, the reaction product is an excellent carrier starch or medium for the Bauer type corrugating adhesive. Starch modified in this way does not reduce boiling alkaline aqueous silver nitrate.

Example 2

An aqueous alkaline slurry of oxidized corn starch is prepared by mixing 100 parts of the granular starch (12% moisture) with 125 parts of water at 25° C. and 0.7 part of sodium hydroxide. The oxidized starch is made by treating native corn starch with a warm sodium hypochlorite bleach. The amount of active chlorine added in the bleach is 4.5% based on the weight of the starch. To the well-stirred slurry, at 25° C. and 11.5 pH, is added 0.5 part of acrolein and stirring is continued for two hours. The slurry is then neutralized to 6.5 pH with sulfuric acid and filtered. The starch is washed with water on the filter and dried. The modified starch thus obtained forms neutral hot water pastes which are more viscous than the parent oxidized starch at the same starch concentration, and which remain relatively fluid and noncongealing when cooled and aged. Boiling alkaline aqueous silver nitrate is not reduced by oxidized corn starch modified as described in this example.

Example 3

The native corn starch in Example 1 is replaced with tapioca starch and the proportion of acrolein to starch is reduced from 0.25% to 0.1%. The reaction product forms a paste in boiling neutral water which is less cohesive and rubbery than a corresponding paste of the parent starch at the same starch concentration. Tapioca starch, modified as described in this example, does not reduce boiling alkaline silver nitrate.

Example 4

The tapioca starch in Example 3 is replaced with potato starch. The reaction product forms a paste in boiling neutral water which is less cohesive (i.e., more salve-like) than a corresponding paste of the parent starch at the same starch concentration. The potato starch derivative produced by this method does not reduce boiling alkaline silver nitrate.

Example 5

The proportion of acrolein starch in Example 1 is reduced from 0.25% to 0.1%. The reaction product forms a paste in boiling neutral water which is more viscous and less cohesive than a corresponding paste of the parent starch. A more striking difference between the pastes may be observed after they have cooled and aged for several hours. The control paste turns to an unpourable gel, whereas the reaction product paste—although appreciably thicker cold than hot—remains fluid. Boiling alkaline silver nitrate is not reduced by starch modified in accordance with the method of this example.

Example 6

The native corn starch in Example 1 is replaced with native corn starch modified by reacting it with 2% of ethylene oxide according to United States Patent 2,516,632. The product obtained by reacting acrolein with the starch hydroxyethyl ether forms a viscous noncongealing paste in neutral hot water, and is useful as a textile printing gum and a pie filling thickener. The modified starch produced in accordance with this example does not contain free aldehyde groups.

Example 7

An alkaline paste of native corn starch is prepared by mixing 30 parts of the granular starch with a solution of four parts of sodium hydroxide in 600 parts of water at 80° C., the paste then cooling to 25° C. To this cooled paste is added with efficient stirring 0.015 part of acrolein and stirring is continued for 30 minutes. The viscosity of the paste may be increased nearly five-fold by the reaction. The reaction paste may be used in its strongly alkaline state, as, for example, in the Bauer type corrugating adhesives. For other uses, as in the preparation of textile and paper products, it may be neutralized with an acid beforehand. This product does not reduce alkaline silver nitrate.

Example 8

One part of the same kind of oxidized starch as used in Example 2 is mixed thoroughly with 0.05 part of acrolein in a steam-jacketed autoclave. The autoclave is sealed and the mixture, while being stirred constantly, is heated for one hour with a steam pressure in the jacket of 15 pounds per square inch gage. The granular starch product thus obtained forms a paste with boiling neutral water which is much thicker at the same starch concentration than the parent starch. Also, the reaction product paste is much less congealing, when cooled and aged, than the parent starch paste. Further, the reaction product gives negative results when tested for free aldehyde with alkaline silver nitrate.

*Example 9*

In this example, the procedure of Example 1 is repeated, except that the amount of acrolein is increased from 0.25 part to 2.0 parts. The final product is a completely inhibited starch, i.e., one which does not perceptibly swell in boiling neutral water, and only very slightly in boiling 1% sodium hydroxide solution. This product also yields a negative test for aldehyde using alkaline silver nitrate.

*Example 10*

Example 2 is repeated, using one part of acrolein in place of 0.5 part. The final product is a highly inhibited starch which swells to a slight degree in boiling neutral water, but does not form a stable paste. The product does produce a stable paste with hot 1% sodium hydroxide solution, and contains no free aldehyde group detectable with boiling silver nitrate.

*Example 11*

A neutral aqueous paste of native corn starch is prepared by mixing 30 parts of the granular starch with 600 parts of water at 90° C. for ten minutes, then cooling the paste to 40° C. The cool paste is charged into a steam-jacketed autoclave equipped with a mechanical stirrer and one part of acrolein is added. The autoclave is closed and the mixture of starch paste and acrolein is heated with stirring for one hour at 95–100° C. by means of the steam jacket. The reaction product thus obtained is much more viscous than the original.

*Example 12*

The procedure of Example 8 is repeated, except that 0.05 part of soda ash is mixed with the starch before the reaction is begun, and the amount of acrolein is reduced to 0.015 part. The product thus obtained resembles the reaction product of Example 7.

*Example 13*

This example illustrates the application of our invention to a British gum type of dextrin. Native corn starch is heated in a conventional dextrinizer at 350–400° F. until the desired dextrinization has occurred. One part of the cooled product was mixed thoroughly with 0.05 part of acrolein and heated for one hour in the sealed dextrinizer at a temperature of 200–220° F. The reaction product forms thicker water pastes than the parent dextrin at the same concentration.

None of the products of Examples 11, 12, and 13 reduces alkaline silver nitrate, indicating that they are substantially free of unreacted aldehyde group.

*Example 14*

One hundred parts of native granular corn starch is reacted with one and with two parts of crotonaldehyde at a pH of 10 in a manner similar to Example 1. The products obtained have properties about the same as those of starch modified with 0.25 and 0.50 parts of acrolein.

The products formed by reacting acrolein or crotonaldehyde with starches in accordance with our invention may be modified by conventional means. Among these are treatment with acids, oxidizing agents, heat (with and without dextrinizing catalysts) and chemical reagents which form starch derivatives.

The products of our invention which form pastes in water and/or dilute alkali are useful generally wherever neutral and alkaline starch pastes are useful, e.g., in corrugating adhesives, textile printing gums, and food products such as pie fillings and salad dressings. The more highly inhibited products which will not paste in hot water are useful as surgical dusting powders, fillers for molding compounds, and the like.

Since many embodiments may be made of this invention and since many changes may be made in the embodiments described, the foregoing is to be interpreted as illustrative only and the invention is to be defined by the claims appended hereinafter.

We claim:

1. The process of changing the paste properties of starch which comprises reacting starch with 0.05 to 2.0% by weight acrolein in the presence of an alkaline catalyst at a pH within the pH range of 10–12 and at a temperature within the range of 20–30° C. until the reaction product is substantially free of the aldehyde group.

2. A process of changing the paste properties of starch which comprises reacting starch in the presence of an alkaline catalyst with 0.05 to 2.0% by weight an unsaturated aldehyde selected from the group consisting of acrolein and crotonaldehyde until the reaction product is substantially free of the aldehyde group.

3. The process of changing the paste properties of starch which comprises reacting starch in an aqueous medium with 0.05 to 2.0% by weight of acrolein in the presence of an alkaline catalyst until the reaction product is substantially free of aldehyde.

4. The process as defined in claim 3 wherein the starch is present in the form of an aqueous paste during the reaction.

5. The process as defined in claim 3 wherein the starch is initially present as an aqueous slurry of ungelatinized granules and remains so during the reaction.

6. The process of changing the paste properties of starch which comprises reacting starch with 0.05 to 2.0% by weight of acrolein in the presence of an alkaline catalyst at a pH of at least 10 until the reaction product contains substantially no free aldehyde.

7. The process of changing the paste properties of starch which comprises reacting superficially dry starch with 0.05 to 2.0% by weight of acrolein in the presence of an alkaline catalyst until the reaction product is substantially free of acrolein.

8. The reaction product of starch and at least 0.05% of an unsaturated aldehyde selected from the group consisting of acrolein and crotonaldehyde, in the presence of an alkaline catalyst, the reaction product containing substantially no free aldehyde group and having the paste properties of an inhibited, cross-linked starch derivative.

9. The product of claim 8 in which the aldehyde is acrolein.

10. The product of claim 8 in which the aldehyde is crotonaldehyde.

References Cited in the file of this patent

UNITED STATES PATENTS

| | | |
|---|---|---|
| 2,461,139 | Caldwell | Feb. 8, 1949 |
| 2,510,748 | Lolkema et al. | June 6, 1950 |
| 2,698,936 | Staerke et al. | Jan. 4, 1955 |
| 2,867,615 | Lehmann et al. | Jan. 6, 1959 |

FOREIGN PATENTS

| | | |
|---|---|---|
| 129,884 | Germany | Mar. 22, 1902 |
| 131,399 | Germany | May 23, 1902 |